Sept. 28, 1954  R. E. ASBURY ET AL  2,690,492
WELDING NOZZLE GUIDE ARM FOR SPIRAL PIPE MACHINES
Filed Sept. 21, 1951  2 Sheets-Sheet 1
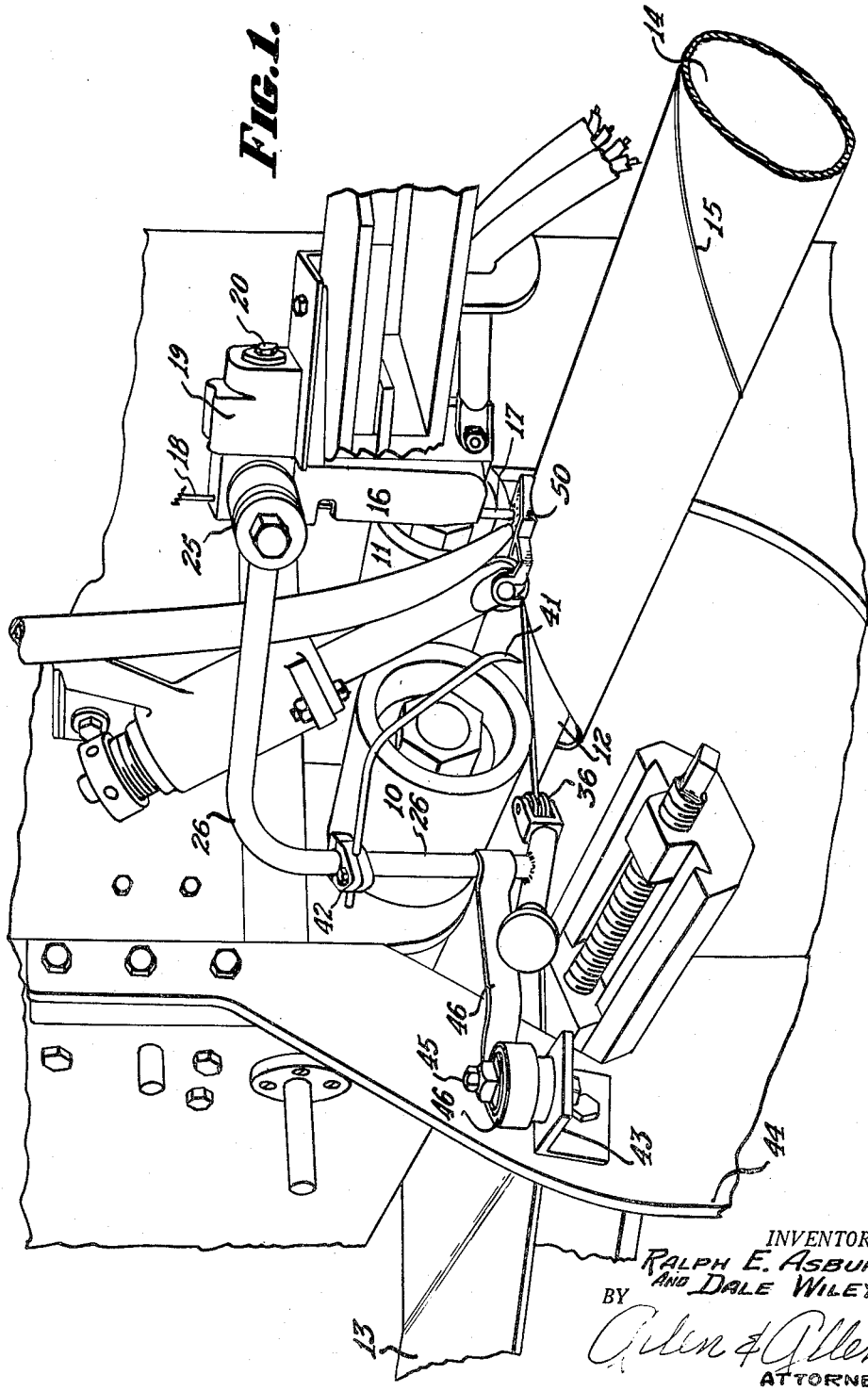
INVENTORS.
RALPH E. ASBURY
AND DALE WILEY,
BY
Allen & Allen
ATTORNEYS.

Sept. 28, 1954 R. E. ASBURY ET AL 2,690,492
WELDING NOZZLE GUIDE ARM FOR SPIRAL PIPE MACHINES
Filed Sept. 21, 1951 2 Sheets-Sheet 2
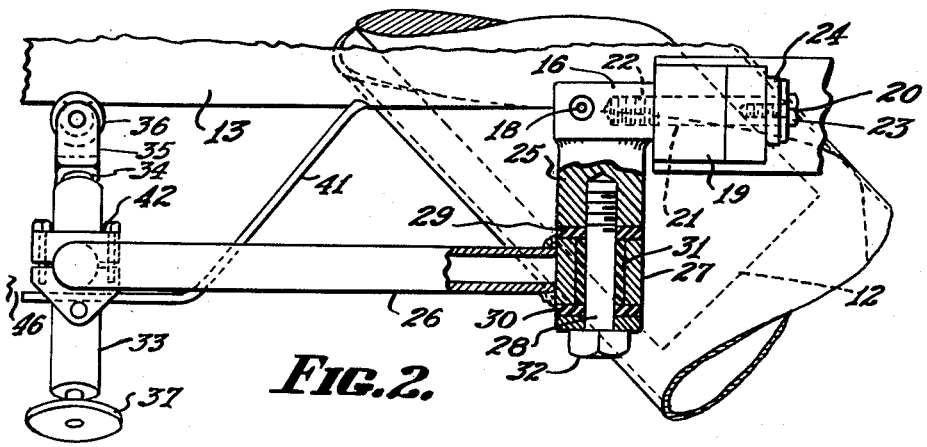
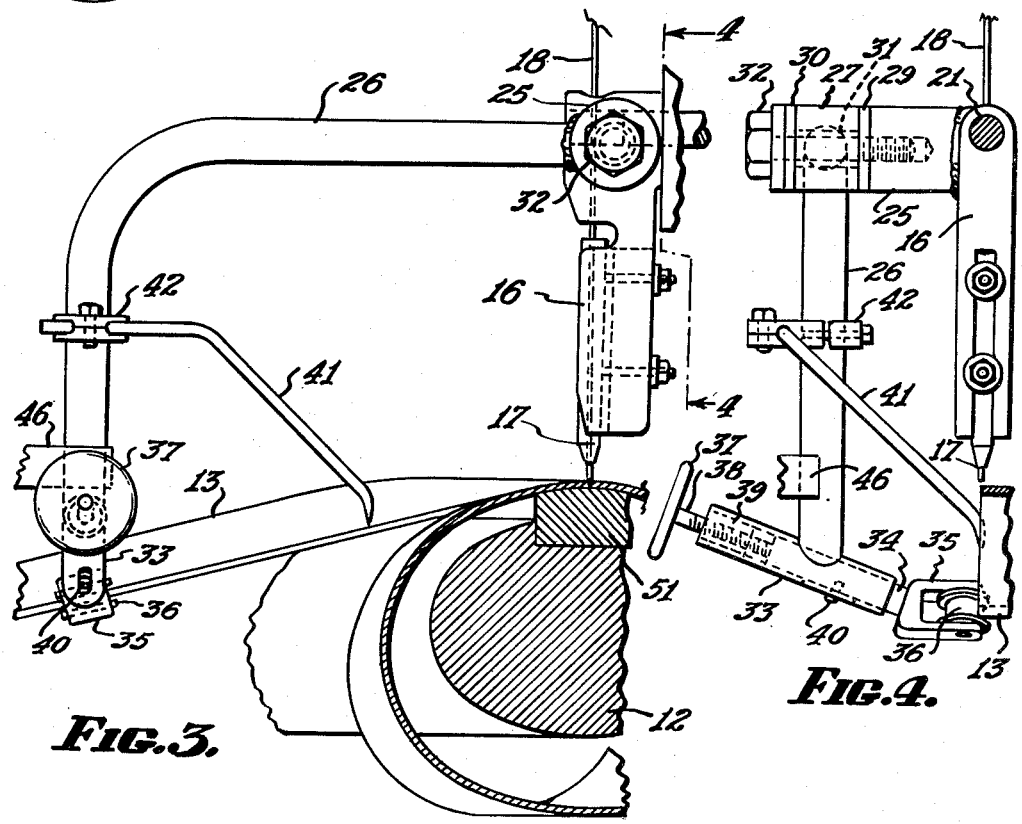
INVENTORS.
RALPH E. ASBURY
AND DALE WILEY,
BY
*Allen & Allen*
ATTORNEYS.

Patented Sept. 28, 1954

2,690,492

UNITED STATES PATENT OFFICE 2,690,492

WELDING NOZZLE GUIDE ARM FOR SPIRAL PIPE MACHINES

Ralph E. Asbury, Waynesville, and Dale Wiley, Middletown, Ohio, assignors to Armco Steel Corporation, Middletown, Ohio, a corporation of Ohio Application September 21, 1951, Serial No. 247,686

8 Claims. (Cl. 219—6)

1

This invention relates to a welding nozzle guide arm for spiral pipe machines. It is illustrated herein in connection with a machine wherein steel strip is fed into forming rolls at an angle and is thereby formed into a helix with the edge of the first convolution meeting the entering edge of the strip, and wherein the meeting edges are welded to form a continuous helical welded seam. The invention is of course equally applicable to helical lock seam pipe wherein it is desired to weld the lock seam. The machine for making the pipe as outlined first above may be of the type disclosed in the copending application of Jonathan Roy Freeze, Serial No. 101,883, filed June 28, 1949.

The strip stock used in forming the pipe will almost invariably have camber and in passing through the machine there may be a slight shifting of the stock so that the edge of the strip as it enters the forming machine will not always stay exactly in the same locus.

With modern welding procedures where submerged arc welding is used it is impossible to see the welding crack, and it is therefore very difficult to insure that the welding head is properly located with respect to the joint to be welded.

It is therefore an object of the present invention to provide a device which will automatically maintain the location of the welding nozzle in proper alignment with the strip edges which are to be welded. It is another object to provide such an arrangement in which means are arranged to ride on the entering edge of the strip and to transmit variations in strip edge position to the welding nozzle through a rigid connection. It is also an object of the invention to provide means whereby the welding nozzle may be adjusted with regard to the means riding on the strip edge in cases where such adjustment is found to be necessary or desirable.

These and other objects of the invention, which will be pointed out in more detail hereinafter, or which will be apparent to one skilled in the art upon reading these specifications, we accomplish by that certain construction and arrangement of parts, of which we shall now describe an exemplary embodiment.

Reference is made to the drawings forming a part hereof and in which:

Figure 1 is a fragmentary perspective view of a pipe forming machine similar to that disclosed in the said copending application and showing the device of the invention in use.

Figure 2 is a plan view of the device of the present invention with parts in section to show the construction.

2

Figure 3 is a front elevational view of the same, and

Figure 4 is an end elevational view taken on the line 4—4 of Figure 3.

Briefly in the practice of our invention we provide a pivotal mounting at any practical point in the welding head assembly so that the wire guide nozzle may pivot about an axis substantially parallel to the edge of the entering strip. A rigid arm is rigidly secured to the welding nozzle holder and has secured to its other end a roller arranged to ride on the strip edge. Means are provided for yieldingly urging the roller against the strip edge. In this way as the strip edge wanders laterally because of stock shift, camber or other irregularities, the nozzle holder is caused to wander a like amount so that the weld is deposited in the proper place.

Referring now in more detail to the drawings we have shown fragments of a spiral pipe machine which may be of the type disclosed in the copending application of Freeze mentioned above. The various forming rolls are indicated at 10, 11 and 12. The entering strip is shown at 13, and the coaction between the rolls 10, 11 and 12 bends the strip which enters these rolls at an angle to form a helix, and when the adjacent edges of the convolutions are welded there is formed the pipe 14 having the spiral seam 15. Other details of the machine which do not form a part of the present invention will not be described further. The nozzle holder itself is indicated at 16 and it is provided with the usual nozzle 17 through which the welding wire or rod 18 is fed by means not forming a part of the present invention. The nozzle holder 16 is mounted on a block 19 for pivotal movement about an axis 20 which is approximately parallel to the edge of the entering strip. The pivot 20 is constituted by a bolt 21 threaded into the nozzle holder 16 as at 22, and passing through a hole in the block 19. At its other end the bolt 21 has a threaded hole for the bolt 23 by means of which the structure can be drawn up snug. Suitable washers may be provided as at 24.

The nozzle holder is provided with the laterally extending boss 25. A rigid arm 26 is provided with a boss 27, and boss 27 is secured to the boss 25 by the bolt 28 and is insulated from the boss 25 and associated parts by means of the insulating washers 29 and 30 and the insulating sleeve 31. A bolt 32 clamps the pieces together.

The rigid arm 26 is generally L-shaped in configuration and has secured to its other end a sleeve 33. The roller supporting bar 34 is seated in the sleeve 33 and carries at its end the yoke 35 in which the roller 36 is rotatively mounted. The roller 36 may be moved in and outward by means of the adjusting hand wheel 37, which has a threaded shank 38 passing through a threaded block 39 within the sleeve 33. A set screw 40 permits the adjustment to be fixed at any desired point.

A pointer 41 is adjustably clamped as at 42 to the rigid arm 26 so that it may be adjusted to indicate the location of the strip edge.

Mounted upon a bracket 43 secured to a fixed portion of frame 44 is a post 45 upon which is mounted the spiral spring 46. One end of the spring 46 is extended and is caused to bear against a portion of the rigid arm 26 to urge it toward the strip edge.

From the description above it will be clear that as the strip advances into the machine the roller 36 rides upon the strip edge, and if any variation in the location of the strip edge occurs which would cause the roller 36 to swing inwardly or outwardly, the entire rigid arm 26 will swing inwardly or outwardly and will cause the nozzle holder 16 to pivot about its axis 20 whereby the end of the nozzle 17 will be caused to follow the variations in the position of the strip edge. The pointer 41 gives a visual indication of the condition from which it can be determined that the apparatus is functioning properly. The actual weld cannot be observed because the operation is covered by a flux retained within a box 50. The edges being welded are supported from below by a backing shoe 51 as is well known in the art and as can be best seen in Figure 3.

From the foregoing description it will be clear that numerous minor modifications may be made without departing from the spirit of the invention which is set forth in the appended claims. We do not therefore intend to limit ourselves except as set forth in the claims which follow.

Having now fully described our invention what we claim as new and desire to secure by Letters Patent is:

1. In a machine for welding spiral pipe in which strip material is fed between forming rolls at an angle and is formed into a helix, and in which a welding nozzle holder is disposed substantially at the point where the edge of the first convolution meets the edge of the entering strip, a pivotal mounting for said nozzle holder about an axis substantially parallel to the edge of the entering strip, means contacting the entering strip edge, and a rigid connection between said contacting means and said nozzle holder to cause said nozzle holder to pivot in accordance with lateral variations in the position of said entering strip edge.

2. A machine according to claim 1, in which means are provided to yieldingly hold said contacting means in contact with said strip edge.

3. A machine according to claim 2, in which said contacting means comprises a roller.

4. A machine according to claim 3, in which said means for yieldingly holding said roller in contact with said strip edge comprises a spiral spring.

5. A machine according to claim 1, in which said nozzle holder has rigidly secured to it a rigid member, a roller rotatively secured to the other end of said member in a position to ride on the edge of the entering strip, and means for yieldingly urging said roller against said strip edge.

6. A machine according to claim 5, in which the position of said roller is adjustable with respect to said rigid member.

7. A machine according to claim 1, in which a spiral spring is provided, one end of said spring being fixed and the other end being secured to said rigid connection to urge said contacting means against said entering strip edge.

8. A machine according to claim 1, in which said rigid connection includes electrical insulating means.

References Cited in the file of this patent

UNITED STATES PATENTS

| Number | Name | Date |
|---|---|---|
| 1,793,280 | Williams | Feb. 17, 1931 |
| 2,330,503 | Longoria | Sept. 28, 1943 |
| 2,440,696 | Patterson | May 4, 1948 |